US 8,065,154 B2

(12) United States Patent
Schindler et al.

(10) Patent No.: US 8,065,154 B2
(45) Date of Patent: Nov. 22, 2011

(54) AUGMENTATIVE COMMUNICATIONS DEVICE FOR THE SPEECH IMPAIRED USING COMMERCIAL-GRADE TECHNOLOGY

(75) Inventors: Kris Schindler, Cheektowaga, NY (US); Michael Buckley, West Seneca, NY (US)

(73) Assignee: The Research Foundation of State Univesity of New York, Amherst, NY (US)

( * ) Notice: Subject to any disclaimer, the term of this patent is extended or adjusted under 35 U.S.C. 154(b) by 1238 days.

(21) Appl. No.: 11/193,114

(22) Filed: Jul. 29, 2005

(65) Prior Publication Data

US 2006/0122838 A1 Jun. 8, 2006

Related U.S. Application Data

(60) Provisional application No. 60/592,561, filed on Jul. 30, 2004.

(51) Int. Cl.
*G10L 21/06* (2006.01)
(52) U.S. Cl. ............ 704/271; 704/4; 704/260; 704/270; 704/270.1
(58) Field of Classification Search ........................ None
See application file for complete search history.

(56) References Cited

U.S. PATENT DOCUMENTS

| 5,210,689 | A | * | 5/1993 | Baker et al. ........................ 704/1 |
| 6,068,485 | A | * | 5/2000 | Linebarger et al. ............ 434/116 |
| 2005/0017954 | A1 | * | 1/2005 | Kay et al. ........................ 345/169 |
| 2005/0050469 | A1 | * | 3/2005 | Uchimoto et al. ............. 715/531 |
| 2005/0283724 | A1 | * | 12/2005 | Griffin .......................... 715/532 |

OTHER PUBLICATIONS

Li Gong and Jennifer Lai, "Shall We Mix Synthetic Speech and Human Speech? Impact on Users' Performance, Perception, and Attitude", CHI 2001, pp. 158-165, vol. 3, Issue 1.
Michael Hunter, Shumin Zhai, and Barton A. Smith, "Physics-Based Graphical Keyboard Design", CHI 2000 Conference.
I. Scott MacKenzie and Shawn X. Zhang, "The Design and Evaluation fo a High-Performance Soft Keyboard", CHI 1999 Conference, p. 25-31, May 1999.
Vivek Tiwari, Sharad Malik, and Andrew Wolfe, "Power Analysis of Embedded Software: A First Step Towards Software Power Minimization", IEEE Transactions on VLSI Systems, p. 427-445, Dec. 1994.
Vivek Tiwari, Sharad Malik, Andrew Wolfe, and Mike Tien-Chien Lee, "Instruction Level Power Analysis and Optimization of Software", Journal of WLSI Processing, Dluwer Academic Publishers, p. 326-328, Jan. 1996.
Gina Venolia, Keith Steury, and Chauncey Parker, "Language Modeling for Soft Keyboards", Technical Report MSR-TR-2001-118, Nov. 28, 2001.
David J. Ward, Alan F. Blackwell, and David J.C. MacKay, "Dasher- a Data Entry Interface Using Continuous Gestures and Language Models", Proceedings of the 13th Annual ACM Symposium on User Interface Software and Technology, Nov. 2000.
R. William Soukoreff and I.Scott MacKenzie, "General Fitts' Law Model Builder", CHI 1995 Conference, p. 113-114, May 1995.

(Continued)

*Primary Examiner* — Leonard Saint Cyr
(74) *Attorney, Agent, or Firm* — Simpson & Simpson, PLLC

(57) ABSTRACT

The present invention broadly comprises a computer-based method for aiding aphasics having gross and fine motor impairments in efficiently communicating, comprising the steps of storing alphanumeric characters in a database, calculating statistics of the alphanumeric characters based on frequency used and most recent used, and, predicting a response according to the statistics of the alphanumeric characters, wherein the steps of storing, calculating, and predicting are performed by a general purpose computer specially programmed to perform the steps of storing, calculating, and predicting.

26 Claims, 6 Drawing Sheets

OTHER PUBLICATIONS

Shumin Zhai, Michael Hunter, and Barton A. Smith, "The Metropolis Keyboard- An Exploration of Quantitative Techniques for Virtual Keyboard Design", CHI Letters, 2000, vol. 2, 2, p. 119-128.

Shumin Zhai, Michael Hunter, and Barton A. Smith, "Performance Optimization of Virtual Keyboards", Human-Computer Interaction, 2002, vol. 17, p. 89-129.

http://www.java-engineer.com/java, Mar. 8, 2006.

"Device Helps Stroke Victims Communicate", USA Today, Oct. 2003, at http://www.findarttcles.com/cf_dls/m1272/2701_132/109085072/p1/article.jhtm.

"UB Talker . . . Bone Combo . . . Broccoli Power", Medstar.com, Jan. 16, 2004, at http://rdu.news14.com/content/headlines/?ArID=38493&SecID=2.

Western New York Archive, "NYSTAR News", Oct. 2003, at http://www.nystar.state.ny.us/n1/archives2003/westA10-03.htm.

http://www.nauka.lucksite.com/archive/2003/news_0109.html http://abclocal.go.com/wpvi/health/HK_October2003.html.

J.G. Neal and S.C. Shapiro. Knowledge representation for reasoning about language. The Role of Language in Problem Solving 2, pp. 27-46, Elsevier Science Publishers, 1987.

J.G. Neal and S.C. Shapiro. Knowledge-Based Parsing. Natural Language Parsing Systems, pp. 49-92, Springer-Verlang, Berlin, 1987.

\* cited by examiner

AUGMENTATIVE COMMUNICATIONS DEVICE FOR THE SPEECH IMPAIRED USING COMMERCIAL-GRADE TECHNOLOGY

CROSS-REFERENCE TO RELATED APPLICATIONS

This application claims the benefit under 35 U.S.C. §119(e) of U.S. Provisional Application No. 60/592,561, filed Jul. 30, 2004.

REFERENCE TO COMPUTER PROGRAM LISTING/TABLE APPENDIX

The present application includes a computer program listing appendix on compact disc. Two duplicate compact discs are provided herewith. Each compact disc contains an ASCII text file of the computer program listing as follows:

| Name | Size | Created |
| --- | --- | --- |
| Category_Complaintsfrm_txt.txt | 34.72 KB | 07/30/2004 5:05:52 PM |
| Category_Contactsfrm_txt.txt | 31.73 KB | 07/30/2004 5:05:52 PM |
| Category_food_breakfastfrm_txt.txt | 38.15 KB | 07/30/2004 5:05:52 PM |
| Category_food_dinnerfrm_txt.txt | 38.04 KB | 07/30/2004 5:05:52 PM |
| Category_food_lunchfrm_txt.txt | 37.95 KB | 07/30/2004 5:05:52 PM |
| Category_food_snacksfrm_txt.txt | 35.31 KB | 07/30/2004 5:05:52 PM |
| Category_greetingsfrm_txt.txt | 37.31 KB | 07/30/2004 5:05:52 PM |
| Category_hobbiesfrm_txt.txt | 26.38 KB | 07/30/2004 5:05:52 PM |
| Category_needsfrm_txt.txt | 31.89 KB | 07/30/2004 5:05:52 PM |
| Category_relaxfrm_txt.txt | 37.28 KB | 07/30/2004 5:05:52 PM |
| Category_weatherfrm_txt.txt | 34.85 KB | 07/30/2004 5:05:52 PM |
| Categoryfrm_txt.txt | 24.81 KB | 07/30/2004 5:05:52 PM |
| David_Keyboardfrm_txt.txt | 165.05 KB | 07/30/2004 5:05:52 PM |
| Health_Carefrm_txt.txt | 40.55 KB | 07/30/2004 5:05:52 PM |
| Historyfrm_txt.txt | 7.25 KB | 07/30/2004 5:05:52 PM |
| Keyboard1frm_txt.txt | 77.17 KB | 07/30/2004 5:05:52 PM |
| Keyboard2frm_txt.txt | 72.76 KB | 07/30/2004 5:05:52 PM |
| Logger_Formfrm_txt.txt | 3.23 KB | 07/30/2004 5:05:52 PM |
| Module1bas_txt.txt | 9.58 KB | 07/30/2004 5:05:53 PM |
| Notepad_formfrm_txt.txt | 11.22 KB | 07/30/2004 5:05:53 PM |
| Personal_Infofrm_txt.txt | 34.11 KB | 07/30/2004 5:05:53 PM |
| SimpleTTSfrm_txt.txt | 60.66 KB | 07/30/2004 5:05:53 PM |
| Talker-2_July-02-2004vbp_txt.txt | 1.93 KB | 07/30/2004 5:05:53 PM |

The computer program listing appendix is hereby expressly incorporated by reference in the present application.

FIELD OF THE INVENTION

The present invention relates generally to a speech output device and more specifically to an augmentative communications software program for the speech impaired having gross and fine motor impairments, which uses commercial-grade technology.

BACKGROUND OF THE INVENTION

Speech output devices are well known in the art for aiding the speech impaired. Known devices typically comprise a computer software database with preprogrammed words, phrases, and sentences, and, at least one synthesized voice. Some devices further comprise a plurality of icons that when selected, speak a word relevant to the icon. Still others include a database for storing phrases and sentences that can be grouped according to the appropriate category for later use. These inventions, however, are costly and are difficult to use by those having gross and fine motor impairments. Hence, these devices provide for slow conversations since they do not offer the flexibility and efficiency desired when communicating.

Thus, there is a longfelt need for a speech output device that provides a speech-impaired user with the ability to have flexible and efficient communications.

SUMMARY OF THE INVENTION

The present invention broadly comprises a computer-based method for aiding aphasics having gross and fine motor impairments in efficiently communicating, comprising the steps of storing alphanumeric characters in a database, calculating statistics of the alphanumeric characters based on frequency used and most recent used, and, predicting a response according to the statistics of the alphanumeric characters, wherein the steps of storing, calculating, and predicting are performed by a general purpose computer specially programmed to perform the steps of storing, calculating, and predicting.

It is therefore, an object of the present invention to provide a speech output device that has a predictive capability wherein the likelihood of a user's response is statistically calculated and presented according to words, phrases, and sentences entered or selected previously in relation to the frequency used, most recent used, time of day used, day of week used, and time of year used.

Another object of the present invention is to provide pre-programmed phrases in a context-relevant manner.

Another object of the present invention is to reduce the cost of an augmentative communications device.

It is a further object of the present invention to provide a software program that allows a user to pre-enter a conversation for future use.

These and other objects, features, and advantages of the present invention will become readily apparent to those having ordinary skill in the art upon reading the following detailed description of the invention in view of the several drawings of the invention.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
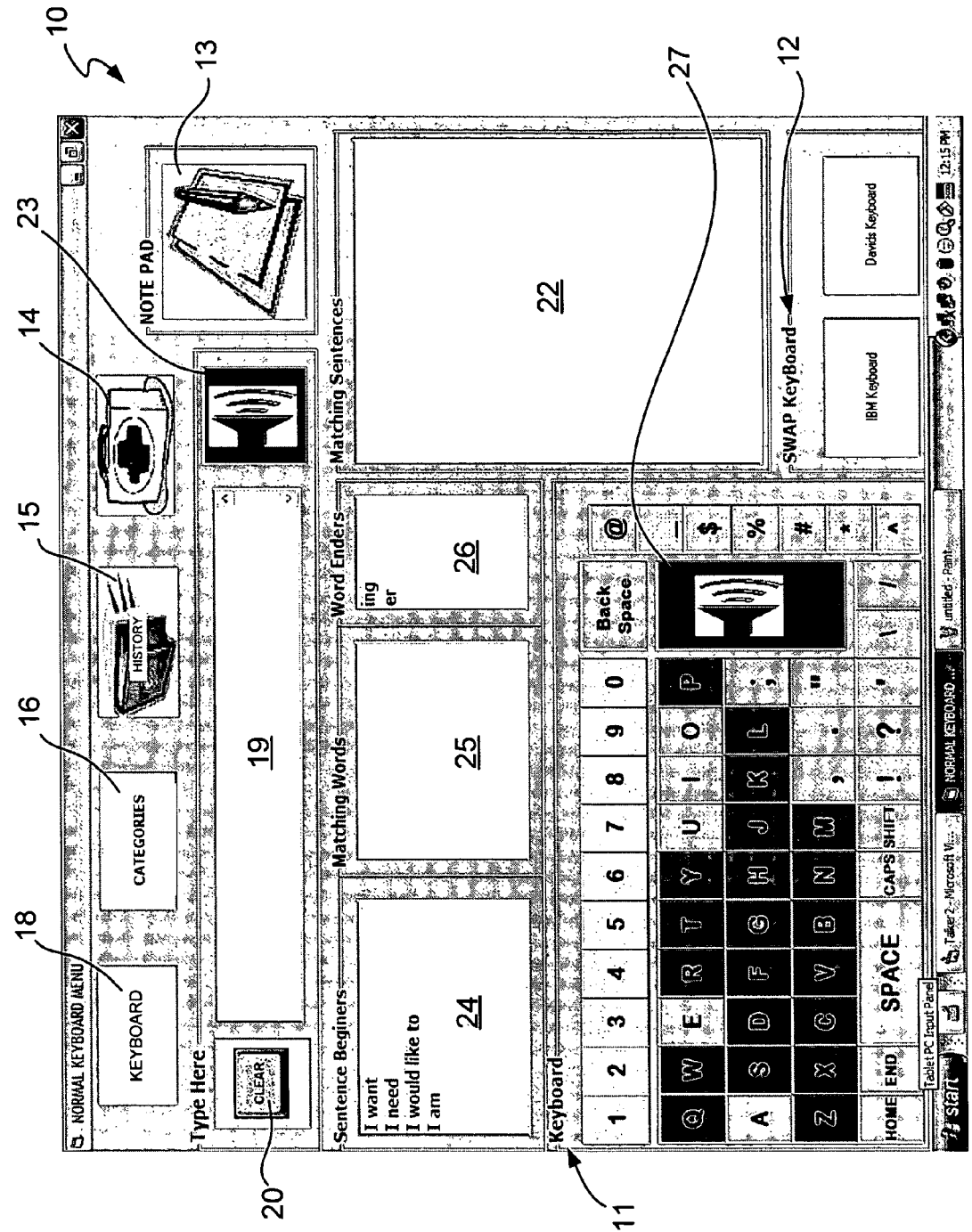
FIG. 1 is a photograph of the Normal Keyboard Menu screen of the present invention.

The invention is best understood from the perspective of an individual using the speech output device to communicate, illustrated via photographs from the software application of the present invention.

The present invention broadly comprises a computerized method and apparatus for helping the speech impaired having means for converting words, phrases, and sentences such as a text-to-speech converter driven by a graphical user interface of a computer, means for inputting and displaying words, phrases, and sentences, and, a database having a predictive capability, and an applications programming interface. By "predictive capability" it is meant that words, phrases, and sentences are displayed by a computer in anticipation of a user's response, wherein a database stores words, phrases, and sentences and a computer statistically calculates and predicts which words, phrases, and sentences are likely to be used according to frequency and most recent used, time of day used, day of week used, and time of year used (i.e., seasonal). The predictive capability is provided by tagging words, phrases, and sentences according to frequency used, most recent used, time of day used, day of week used, and time of year used, and storing the tagged words, phrases, and sentences in a database such that future words, phrases, and sentences are predicted and presented to a user. As described in detail infra, the means for inputting and displaying the words, phrases, and sentences generally comprise an input device and a computer screen, respectively.

The invention is now described with reference to photographs in the form of drawing figures arranged from the perspective of a user. The photographs, together with the written description of them, enable a person having ordinary skill in the art to use the invention, whereas the enclosed software code listing enables a person having ordinary skill in the art to make the invention. For purposes of illustration, a fictional name of a user appears throughout the drawing figures and specification.

Adverting now to the figures, FIG. 1 is a photograph of Normal Keyboard Menu screen 10 of the present invention. As shown in FIG. 1, graphical user interface comprises Normal Keyboard Menu screen 10, which is first encountered upon entering the system However, it should be appreciated that the first screen encountered upon entering the system may be a predicted menu screen based on menu screens previously chosen by a user according to the time of day, day of week, and time of year and according to menu screens used most frequently and used most recently. In a preferred embodiment, the device is readily available on a laptop computer having a touch-screen, audio output via onboard speakers, and an input device such as a keyboard overlay, joystick, trackball, push-button, or eye movement input device. Another example of an input device that can be used is a brain wave sensing device allowing a user to send signals to a computer via a brain wave sensing headband. However, it should be readily apparent that other input devices may be used, and these modifications are intended to be within the spirit and scope of the invention as claimed. The device may be used on a desktop computer or adapted for use on a personal digital assistant (PDA) as well. Normal Keyboard Menu screen 10 comprises Keyboard 11, Swap Keyboard buttons 12, Notepad button 13, Help button 14, History button 15, Categories button 16, Keyboard button 18, View screen 19, Clear button 20, Matching Sentences window 22, windows 24, 25, 26, and Speak buttons 23, 27. It should be appreciated by those having ordinary skill in the art that the layout of the graphical user interface is intended to minimize the radial distance that the user has to move an input device to make a selection. For this reason, Normal Keyboard Menu screen 10 comprises a first Speak button 23 and second Speak button 27. Keyboard 11 on Normal Keyboard Menu screen 10 is operatively arranged to allow a user to enter alphanumeric characters by selecting the keyboard keys having alphanumeric characters via an input device. Alphanumeric characters are displayed on View screen 19 upon receiving an input signal from the user via an input device. The alphanumeric characters may comprise words, phrases, and sentences. Upon a user beginning to input words, phrases, or sentences, the computer will predictively complete the word, phrase, or sentence. After a user has inputted alphanumeric characters via an input device, and the desired word, phrase or sentence is completed via the user and/or the predictive capability of the device, Speak button 23 or 27 may be selected. Upon selecting speak button 23 or 27, the text-to-speech converter delivers the converted text-to-speech through the onboard speakers. It should be apparent to those having ordinary skill in the art that other means may be used to generate an input signal. For example, a synthesized voice may be operatively arranged to whisper menu selections and other screen information to a user, wherein a user triggers an input device when the user hears the desired selection. Further, the system may comprise an auto-scan mechanism wherein the menu choices are automatically scanned and a user selects a desired choice via an input device when the desired choice is indicated.

Matching Sentences window 22 comprises the predictive capability described in detail supra. Once a user begins to enter a sentence into View screen 19, a list of sentences that match the entered information appears in Matching Sentences window 22. A user may then select an entire sentence, rather than entering the sentence verbatim into View screen 19 via Keyboard 11. The phrase completion is based on a dynamic prediction. By "dynamic" it is meant that the statistics are calculated each time a word, phrase, or sentence is entered and thus, the device becomes easier to use over time, since it adapts to a user's habits and patterns. An individual having a speech impairment is therefore, able to communicate with others quicker and more efficiently.

In the preferred embodiment, Sentence Beginners window 24 provides a list of predetermined beginning sentence phrases. Upon selecting a provided beginning sentence phrase, the phrase will appear in View screen 19. Matching Words window 25 comprises the predictive capability described in detail supra. Once a user begins to enter a word into View screen 19, a list of predicted words appears in window 25. A user can select a word in window 25 such that the word appears in View screen 19. In window 25, words are automatically populated according to the predictive capability of the present invention, wherein a database is used to tag and store a user's preferred words according to the frequency used, most recent used, time of day used, day of week used, and time of year used. Finally, Word Enders window 26 provides a list of predetermined word endings. Upon selecting a provided word ending, the word ending will appear in View screen 19. It should be readily apparent that Normal Keyboard Menu screen 10 may comprise a plurality of prediction windows and these modifications are intended to be within the spirit and scope of the invention as claimed. In some aspects, a Global Positioning System (GPS) is incorporated such that words, phrases, and sentences are also predicted according to location. Therefore, a context-awareness is provided and may be based on a plurality of factors including: location, frequency of use, most recent used, time of day used, day of week used, and time of year used. It should be appreciated that words, sentences, and phrases may also be completely entered by a user or pre-programmed into the database via an applications programming interface. The applications programming interface may be used to alter and/or add statistics, database characteristics, login functions, and to provide other basic capabilities. Further, menu target size, menu selections, colors, volume, and parameters affecting content prediction and phrase completion may be configurable. The database further comprises internal tracking means wherein a history of relevant parameters such as the number of corrected or rejected phrases is tracked to improve the long-term evolution of the device.

Help button 14 of Normal Keyboard Menu screen 10 is an important feature of the present invention. Upon selecting Help button 14, a voice will immediately speak a predetermined message, wherein others are alerted by the device's voice that the user needs urgent assistance. In a preferred embodiment, the volume of the voice speaking the predetermined message will be increased when Help button 14 is selected. Commercial text-to-speech engines that are well known in the art may be used as the synthesized voice. For example, a plurality of AT&T's Natural Voices™ may be provided such that the user may choose among a variety of voices. It should be appreciated that a pre-recorded voice of the user or another individual may be used as well.

The system further comprises an emotion-component wherein the voice's intonation may be changed according to the user's current emotions. For example, a user may select an angry mode, shout mode, polite mode, whisper mode, or normal mode such that the inflection of the device's speech is altered accordingly. It should be appreciated that a predictive emotion feature is contemplated wherein a synthesized voice speaks in a mode determined according to the user's biometric measurements and via algorithmic filtering. For example, if a user is angry and enters information to be spoken, the synthesized voice would have an increased volume and change of intonation as a result of the user's change in biometric measurements.

Figure 5:
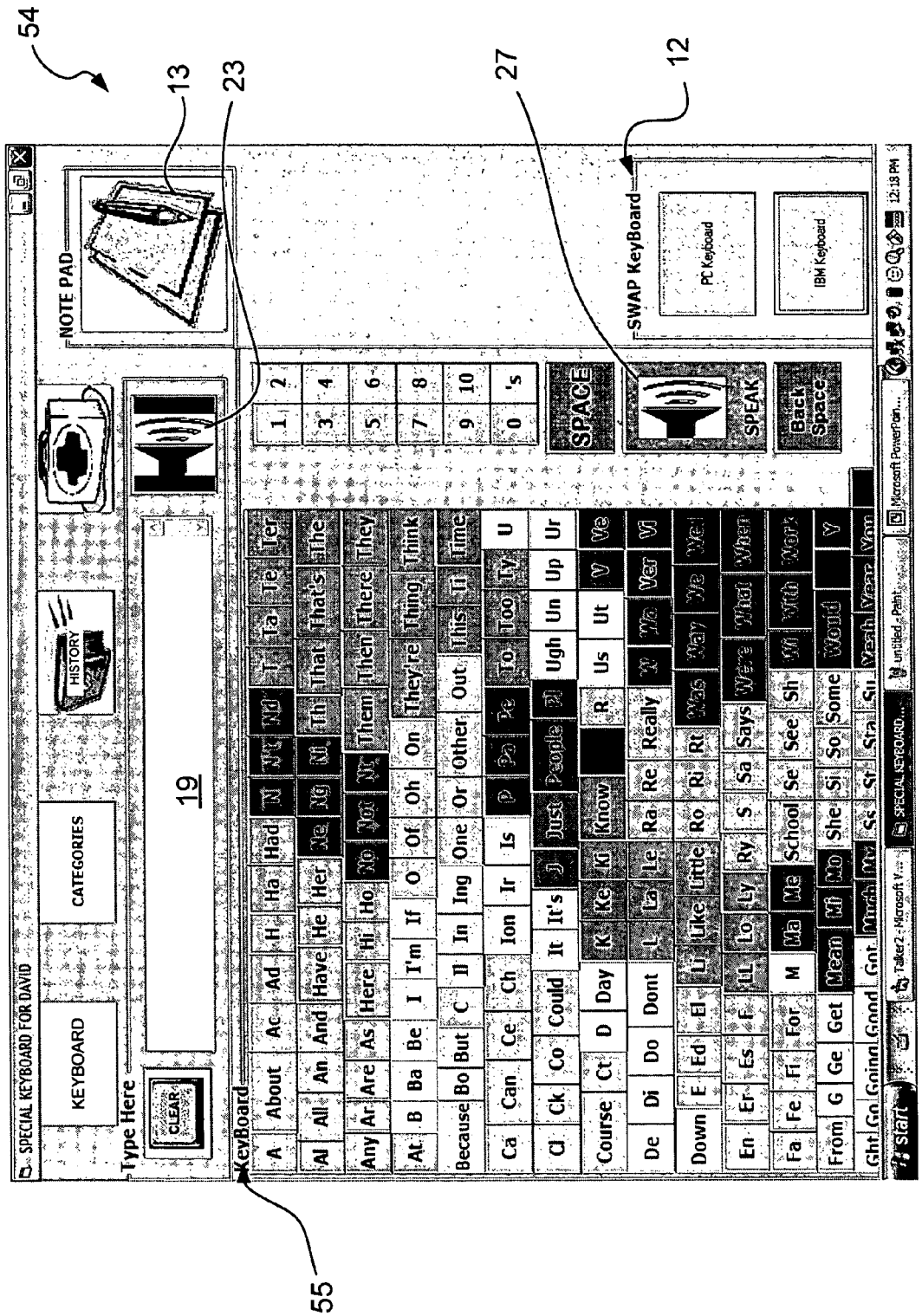
FIG. 5 is a photograph of the Special Keyboard for David screen, which is accessed by selecting the Keyboard button of the Categories Menu screen of FIG. 2; and, FIG. 6 is a photograph of the Notepad screen of the present invention, which is accessed by selecting the Notepad button of FIGS. 1-5.
Figure 6:
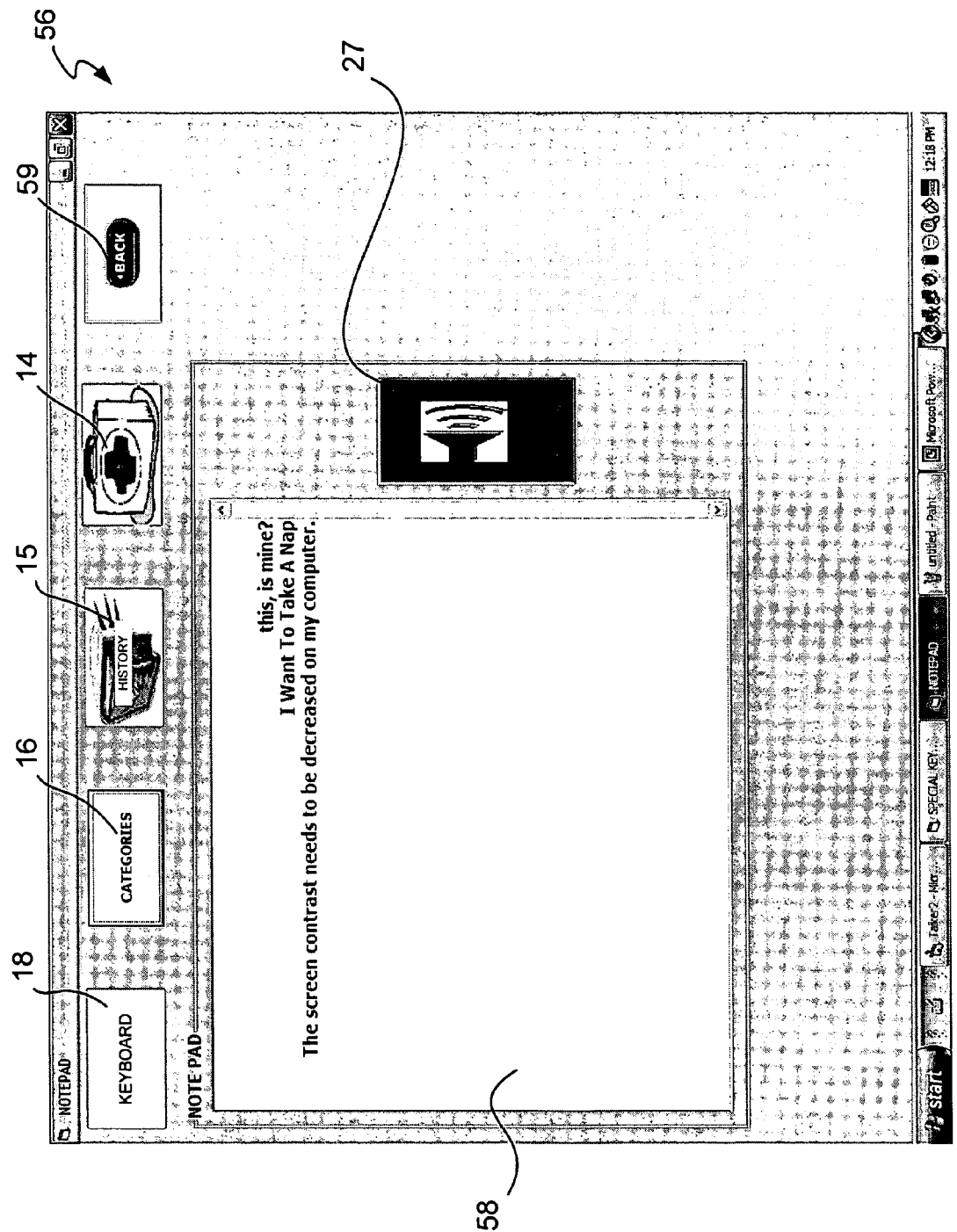

To remove or delete entered alphanumeric characters from View screen 19, Clear button 20 may be selected. Upon selecting Keyboard button 18, Special Keyboard for David screen 54 is launched as described in detail infra and as shown in FIG. 5. Similarly, upon selecting Notepad 13, Notepad screen 56 appears as described in detail infra and as shown in FIG. 6. Upon selecting History button 15, a chronological list of words, phrases, and sentences that have been previously converted from text-to-speech is provided. Upon selecting Swap Keyboard button 12, Keyboard 11 is switched from a standard keyboard layout as shown in FIG. 1, to a specialized keyboard designed according to a user's preferences. The specialized keyboard may appear similar to Keyboard 55 shown in FIG. 5.

Figure 2:
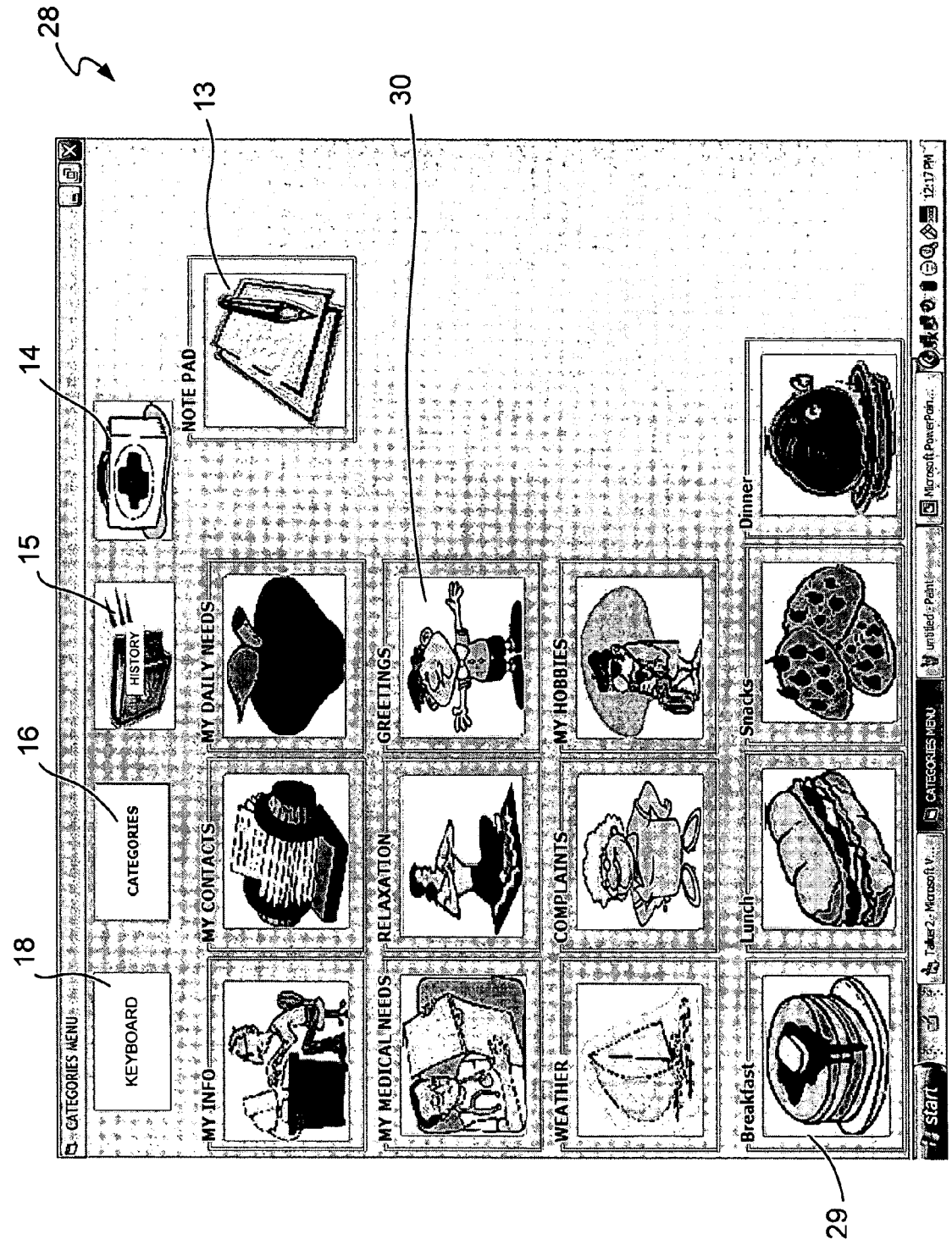
FIG. 2 is a photograph of the Categories Menu screen of the present invention.

FIG. 2 is a photograph of Categories Menu screen 28 of the present invention. Categories Menu screen 28 is launched upon selecting Categories button 16 of Normal Keyboard Menu screen 10 of FIG. 1. Categories Menu screen 28 broadly comprises a plurality of category buttons. Each category button further comprises a category title and corresponding category icon. For example, Breakfast button 29 and Greetings button 30 have category titles "Breakfast" and "Greetings," respectively, and a corresponding icon. Notepad button 13, Help button 14, History button 15, Categories button 16, and Keyboard button 18 of the screen of FIG. 1 also appear on Categories Menu screen 28 of FIG. 2. Having Keyboard button 18, Categories button 16, History button 15, and Help button 14 appear in the same position on every screen allows a user to easily locate and launch a screen regardless of the current screen being viewed. It should be apparent that although graphics are used to illustrate the category choices, photographs or other picture types may be used to illustrate the categories. Further, it should be appreciated that categories other than those provided in Categories Menu screen 28 are contemplated and these modifications are intended to be within the spirit and scope of the invention as claimed.

Figure 3:
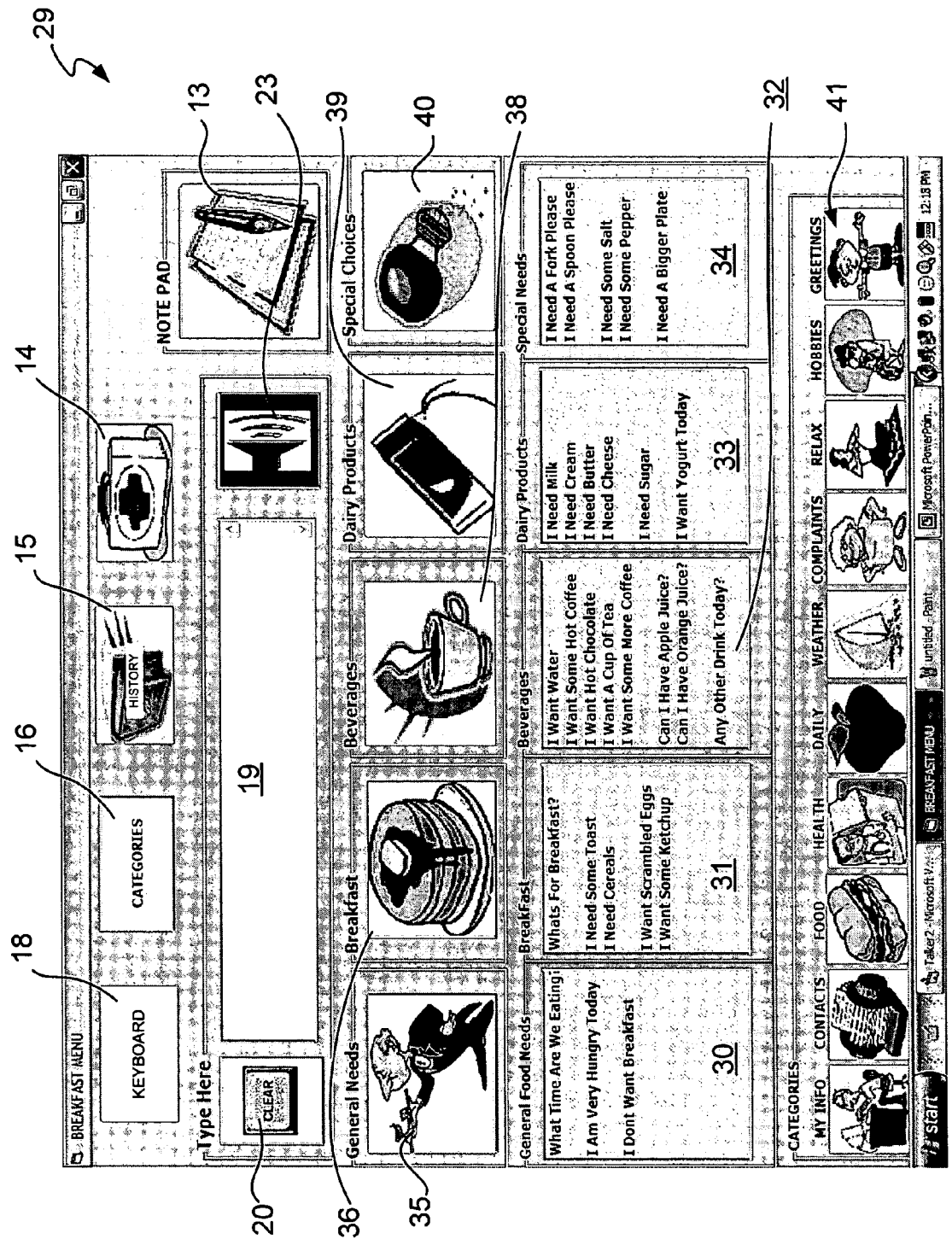
FIG. 3 is a photograph of the Breakfast Menu screen, which is accessed by selecting the Breakfast button of the Categories Menu screen of FIG. 2.

FIG. 3 is a photograph of Breakfast Menu screen 29, which is accessed by selecting Breakfast button 29 of Categories Menu screen 28 of FIG. 2. Breakfast Menu screen 29 broadly comprises windows 30, 31, 32, 33, and 34 with corresponding Category Picture buttons 35, 36, 38, 39, and 40. Windows 30, 31, 32, 33, and 34 comprise a plurality of preprogrammed words, phrases, and sentences, which are categorized and displayed by topic to improve a user's ability to access information according to the context of a conversation. For example, window 30 comprises a list of sentences related to a user's general breakfast needs such as the sentence "I don't want breakfast." Window 31 comprises a list of sentences related to breakfast food preferences such as "I want scrambled eggs." Windows 32, 33, and 34 comprise a list of sentences related to beverage preferences, dairy product preferences, and special preferences, respectively. Upon selecting a sentence provided in window 30, 31, 32, 33, or 34, the sentence will appear in View screen 19. The selected word, phrase, or sentence appearing in View screen 19 will be converted into speech when Speak button 23 is selected. The corresponding Picture buttons 35, 36, 38, 39, and 40 help a user quickly identify the desired categories. This feature also allows an illiterate individual to use the device. For example, a user may select a relevant icon, listen to whispered sentence selections, and then select the desired sentence via an input device when the desired sentence is heard. Categories buttons 41 are provided so that other categories may be easily accessed directly from Breakfast Menu screen 29.

Figure 4:
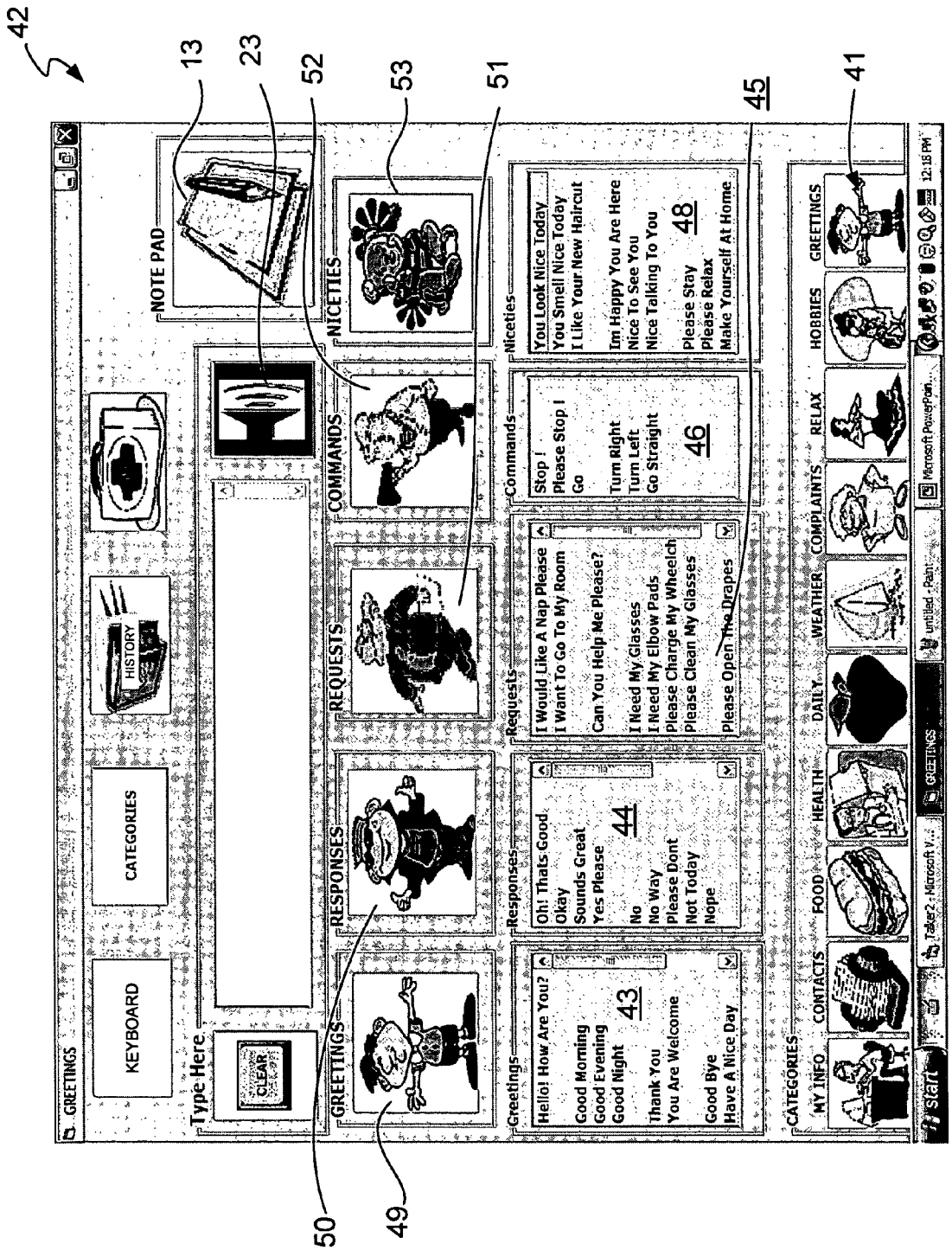
FIG. 4 is a photograph of the Greetings screen, which is accessed by selecting the Greetings button of the Categories Menu screen of FIG. 2.

FIG. 4 a photograph of Greetings screen 42, which is accessed by selecting Greetings button 30 of Categories Menu screen 28 of FIG. 2. Greetings screen 42 is also accessible by selecting the Greetings button of the Categories buttons 41 shown in FIG. 3. Screen 42 displays windows and corresponding pictures that are relevant to the Greetings category. Therefore, windows 43, 44, 45, 46, and 48 list sentences related to Greetings, Responses, Requests, Commands, and Niceties, respectively, with respective Picture buttons 49, 50, 51, 52, and 53 displayed above. It should be apparent that each categories screen may have a plurality of category windows having preprogrammed responses, which are presented to a user in a context-relevant manner, and these modifications are intended to be within the spirit and scope of the invention as claimed.

FIG. 5 is a photograph of Special Keyboard for David screen 54, which is accessed by selecting Keyboard button 18 of Categories Menu screen 28 of FIG. 2. However, Keyboard button 18 appears in the same position on every screen allowing a user to easily locate and launch screen 54 regardless of the screen being viewed. Special Keyboard 55 allows a user to enter phrases and sentences that are not preconfigured into the system, thereby giving a user the flexibility needed in conversation. Special Keyboard 55 further enhances communication capabilities by providing a user with a quick and efficient keyboard layout. For example, the distance that the user has to move an input device to make a selection on screen 54 is minimized. Further, Special Keyboard 55 comprises numbers, letters, words, and word parts arranged according to a user's preferences. Further increasing the efficiency of Special Keyboard 55 is a color-coding feature, wherein different colors are used to indicate different keyboard areas. As in the photographs of FIGS. 1, 3, and 4, entered words appear in View screen 19 and are spoken by the synthesized voice when Speak button 23 or 27 is selected. Also, as illustrated on Normal Keyboard Menu screen 10 of FIG. 1, Swap Keyboard buttons 12 are provided on Special Keyboard for David 54 screen so that a user may easily switch keyboard layouts if desired. Swap Keyboard buttons 12 provide the user a choice of switching between a standard keyboard layout as shown in FIG. 1 and Special Keyboard 55.

FIG. 6 is a photograph of Notepad screen 56 of the present invention, which is accessed by selecting Notepad button 13 of FIGS. 1-5. Notepad screen 56 allows a user to pre-enter and store words, phrases, and sentences prior to a conversation, and is another novel feature of the invention. A user may pre-enter information into large View screen 58 and save the information for later use. When a user would like the device to speak the pre-entered conversation, the user may access Notepad screen 56, select the pre-entered information, and then select Speak button 27. In addition to Help button 14, History button 15, Categories button 16, and Keyboard button 18 appear on Notepad screen 56. Back button 59 is provided which brings a user to the previous screen.

Thus, it is seen that the objects of the invention are efficiently obtained, although modifications and changes to the invention may be readily imagined by those having ordinary skill in the art, and these changes and modifications are intended to be within the scope of the claims.

What is claimed is:

1. A computer-based method for aiding aphasics having gross and fine motor impairments in efficiently communicating, comprising the steps of:
   storing, using a processor for a specially programmed general purpose computer, respective pluralities of words, phrases, and sentences in a database for the general purpose computer;
   accepting, using a graphical interface device for the specially programmed general purpose computer, only a portion and not all of a word via an input device for the general purpose computer;
   determining, using the processor and a global positioning system (GPS) incorporated in the specially programmed general purpose computer, at least one previous location of the specially programmed general purpose computer;
   associating, using the processor, previous occurrences of the respective pluralities of words, phrases, and sentences in the specially programmed general purpose computer with the at least one previous location;
   calculating, using the processor, respective statistics regarding inclusion of said only a portion and not all of a word in said respective pluralities of words, phrases, and sentences based on: the association of the respective pluralities of words, phrases, and sentences with the at least one previous location; frequency used; and most recent used;
   determining, using the processor and the GPS, a current location of the specially programmed general purpose computer;
   selecting, using the processor, the current location of the specially programmed general purpose computer, and the respective statistics, at least one word, phrase, or sentence from the respective pluralities of words, phrases, and sentences as a predicted response to the only a portion and not all of a word;
   providing, on the graphical user interface, the at least one word, phrase, or sentence.

2. The method of claim 1, wherein said respective statistics are further based on time of day used, day of week used, and time of year used.

3. The method of claim 1, wherein said input device is a device selected from the group consisting of touch-screen, keyboard, joystick, trackball, push-button, brain wave sensing, and eye movement input devices.

4. The method of claim 1, wherein said respective pluralities of words, phrases, and sentences are displayed on the graphical user interface upon receiving an input signal from said input device.

5. The method of claim 4, wherein said graphical user interface comprises a view screen wherein said respective pluralities of words, phrases, and sentences are displayed upon receiving said input signal from said input device.

6. The method of claim 5, wherein said input signal is entered by said user via a keyboard displayed on said view screen.

7. The method of claim 6, wherein said keyboard comprises color-coded areas.

8. The method of claim 6, wherein said keyboard comprises a standard keyboard layout.

9. The method of claim 4, wherein said respective pluralities of words, phrases, and sentences, displayed on said graphical user interface are converted into speech via a text-to-speech converter.

10. The method of claim 9, wherein said text-to-speech converter delivers speech through onboard speakers when said user selects a speak button.

11. The method of claim 10, wherein said graphical user interface comprises at least two speak buttons such that a radial distance that said user has to move said input device to make a selection is minimized.

12. The method of claim 10, wherein said speech delivered through onboard speakers reflects said user's emotion via a mode selected from the group consisting of angry, shout, polite, whisper, and normal modes.

13. The method of claim 12, wherein said speech delivered through onboard speakers reflects said user's emotion via a predictive emotion feature wherein said user's biometric measurements are determined such that emotions are predicted accordingly.

14. The method of claim 9, wherein said speech is provided by a synthesized voice from a commercial text-to-speech engine.

15. The method of claim 9, wherein said speech is provided by a pre-recorded voice.

16. The method of claim 1, wherein said predicted response is a predicted word appearing in a first prediction window of said graphical user interface.

17. The method of claim 1, wherein said predicted response is a predicted sentence appearing in a second prediction window of said graphical user interface.

18. The method of claim 1, wherein a plurality of prediction windows are provided on said graphical user interface.

19. The method of claim 1, further comprising tagging and storing said user's preferred words, phrases, and sentences from the respective pluralities of words, phrases, and sentences according to frequency used, most recent used, time of day used, day of week used, and time of year used.

20. The method of claim 1, wherein said graphical user interface further comprises a plurality of category windows.

21. The method of claim 20, wherein said plurality of category windows comprises preprogrammed responses presented in a context-relevant manner.

22. The method of claim 21, wherein said preprogrammed responses are displayed in said plurality of categories windows and are selectable such that a first response appears in said view screen and is converted into speech upon said user selecting said speak button.

23. The method of claim 1, wherein said respective pluralities of words, phrases, and sentences are entered into a notepad by said user such that said respective pluralities of words, phrases, and sentences are stored for later use.

24. An apparatus for aiding aphasics having gross and fine motor impairments in efficiently communicating, comprising a specially programmed computer including a database, a processor, and a graphical user interface:
   wherein the database is for storing respective pluralities of words, phrases, and sentences;
   wherein the input device is for accepting only a portion and not all of a word;
   wherein the processor is for:
      determining, using a global positioning system (GPS) incorporated in the specially programmed general purpose computer, at least one previous location of the specially programmed general purpose computer;
      associating respective occurrences of the respective pluralities of words, phrases, and sentences in the specially programmed general purpose computer with the at least one previous location;
      calculating respective statistics regarding inclusion of said only a portion and not all of a word in said respective pluralities of words, phrases, and sentences based on the association of the respective pluralities of words, phrases, and sentences with the at least one previous location, frequency used and most recent used;
      determining, using the GPS, a current location of the specially programmed general purpose computer; and,
      selecting, using the current location of the specially programmed general purpose computer and the respective statistics, at least one word, phrase, or sentence from the respective pluralities of words, phrases, and sentences as a predicted response to the only a portion and not all of a word; and,
   wherein the graphical user interface is for providing the at least one word, phrase, or sentence.

25. The apparatus of claim 24, further comprising a help button such that said apparatus shouts for help when said help button is selected.

26. A computer-based method for aiding aphasics having gross and fine motor impairments in efficiently communicating, comprising the steps of:
   storing, using a processor for a specially programmed general purpose computer, respective pluralities of words, phrases, and sentences in a database for the general purpose computer;
   accepting, using a graphical interface device for the specially programmed general purpose computer, at least a portion of a word via an input device for the general purpose computer;
   determining, using the processor and a global positioning system (GPS) incorporated in the specially programmed general purpose computer, at least one previous location of the specially programmed general purpose computer;
   associating, using the processor, respective occurrences of the respective pluralities of words, phrases, and sentences in the specially programmed general purpose computer with the at least one previous location;
   calculating, using the processor, respective statistics regarding inclusion of the at least a portion of a word in said respective pluralities of words, phrases, and sentences based on the association of the respective pluralities of words, phrases, and sentences with the at least one previous location;
   determining, using the processor and the GPS, a current location of the specially programmed general purpose computer;
   selecting, using the processor, the current location of the specially programmed general purpose computer, and the respective statistics, at least one word, phrase, or sentence from the respective pluralities of words, phrases, and sentences as a predicted response to the at least a portion of a word;
   providing, on the graphical user interface the at least one word, phrase, or sentence.

* * * * *